Figure 1:
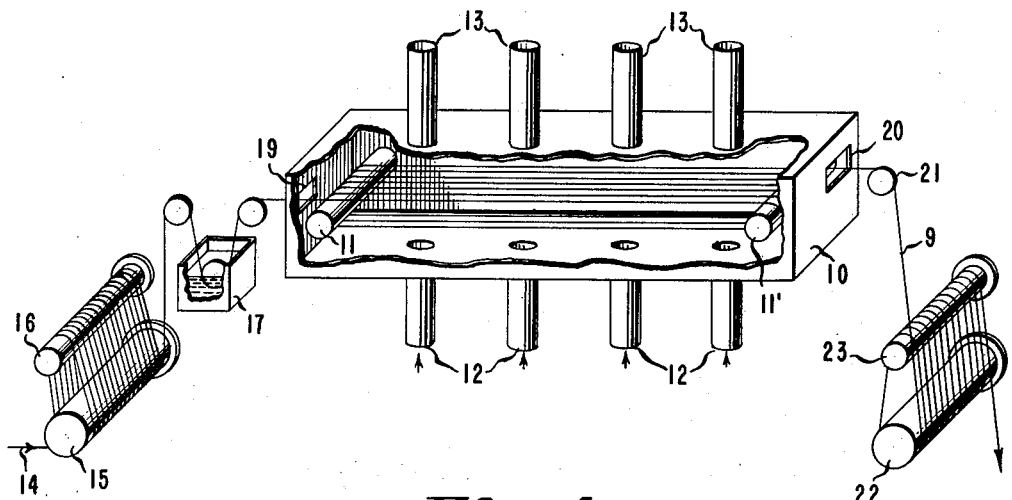

Oct. 1, 1957     H. H. SCHENKER     2,807,863
MULTI-STEP STRETCHING OF NYLON CORDS
Filed June 22, 1956

INVENTOR
HENRY H. SCHENKER

BY *Raymond E. Bloomfield*

ATTORNEY

United States Patent Office 2,807,863
Patented Oct. 1, 1957

2,807,863

MULTI-STEP STRETCHING OF NYLON CORDS

Henry H. Schenker, Wilmington, Del., assignor to E. I. du Pont de Nemours and Company, Wilmington, Del., a corporation of Delaware Application June 22, 1956, Serial No. 593,158

7 Claims. (Cl. 28—72)

This invention relates to an improved treatment for tire cords. More specifically this invention relates to an improved method for treating tire cords from synthetic linear polyamides, whereby improved properties are obtained.

Tire cords prepared from synthetic linear polyamide filaments have shown a high degree of utility because of their outstanding properties. These cords are unexcelled in breaking strength, impact resistance and long life under fatigue stresses. However, these cords have some shortcomings which to some extent limit their utility in this field. For example, cords twisted even from highly drawn yarn have an excessive stretch under small loads, which cause tires made from such cords to grow or increase in size on inflation and in use. This excessive stretch is reduced by subjecting the cord to a hot stretching operation. Although the hot stretching operation has reduced the length increase or "growth" of the nylon cords to a tolerable level, it has accentuated other difficulties. For example, such highly stretched cords shrink when heated to temperatures such as those encountered in vulcanizing, thus distorting the tire and in some cases even pulling the cord fabric away from the beads of the newly formed tire. These factors tend to limit the degree of hot stretching to which a nylon tire cord can be subjected.

It is known that the effect of hot stretching on tire cord properties is to increase break strength, decrease break elongation, and to decrease the cold growth of the cord, but, as has been stated hereinabove, the shrinkage and shrinkage tension at high temperatures are increased simultaneously. Moreover, the resistance of the cord to in-rubber fatigue is also lowered by excessive hot stretching, and, therefore, stretching conditions must be carefully selected in order to produce tire cord with the best balance of properties. It is, of course, obvious that excessively severe conditions of temperature or stretching tension are detrimental to the properties of the cord when filaments are broken or the polymer is thermally degraded.

It is an object of this invention to provide a process for the preparation of an improved tire cord from a linear polyamide.

It is a further object of this invention to provide a process for the preparation of a tire cord with lower "free shrinkage" and lower "shrinkage tension" than any cord heretofore attainable while maintaining other important physical characteristics of linear polyamides such as breaking strength, impact resistance, etc.

Other objects of this invention and the means for their attainment will be obvious from the following description.

It has now been found that a cord of a synthetic linear polyamide having improved properties can be produced by stretching the polyamide cord in three stages. Stage I stretching is carried out at an oven temperature of at least about 190° C. but not higher than about 15° C. below the polyamide melting point, with between about 220° C. and about 240° C. preferred for polyhexamethylene adipamide. The stretching tension is 1.5 to 3.0 grams per denier (based on the initial denier of the cord before stretching), with a preference for 2.0 to 2.3 grams per denier. Stretching time (at the elevated temperature) is from about 10 to about 120 seconds, with best results obtained at an exposure of between about 15 and about 45 seconds.

Stage II stretching is carried out at a temperature less than that of stage I but greater than the "force-to-draw" transition temperature of the polyamide. The "force-to-draw" transition temperature of the polyamide is that temperature at which a discontinuity exists in the relationship of a logarithmic function of the tension required to draw an undrawn filament (as defined hereinafter) versus the reciprocal of the drawing temperature in degrees absolute. This "force-to-draw" temperature for polyhexamethylene adipamide and polycaproamide is in the vicinity of 150° C., being about 155° C. for polyhexamethylene adipamide. At about the same temperature these polyamides undergo a crystalline transition (irreversible in the case of polycaproamide) on cooling from the melt. The preferred stage II stretching temperature for polyhexamethylene adipamide is 155 to 165° C. Stage II stretching is carried out at a very low tension, as compared to stage I, such that the cord is allowed to relax or shrink from about 1% to about 10% of the length at which it entered stage II. The preferred relaxation is 3% of the stage II entry length. The time of exposure in stage II is from about 10 to about 120 seconds, and preferably from about 15 to about 45 seconds.

Stage III stretching is ordinarily carried out at temperature about equal to or above that of stage I. The preferred temperature is thus between about 220 and about 240° C. for polyhexamethylene adipamide. The stretching tension is adjusted to about equal or exceed the shrinkage tension of the cord product of stage I, measured at the temperature of stage III (shrinkage tension measured as described hereinafter). It is preferred that said stretching tension be at least about 50% greater than the shrinkage tension determined as described. Typical tension values illustrating preferred conditions for stretching polyhexamethylene adipamide in stage III are from 0.75 to 1.25 grams per denier. The exposure time in this stage is from about 10 to about 120 seconds, with from about 30 to about 90 seconds preferred.

Following dry heat treatment in accordance with this invention, it is essential that the filament, yarn or cord be prevented from relaxing or shrinking. Accordingly, the filament, yarn or cord, upon leaving stage III of the process, is maintained under sufficient tension to prevent any substantial shrinkage thereof until the filament, yarn or cord is cooled to a temperature at least 10% lower than the treatment temperature employed in stage III. Winding the cord leaving stage III at a tension of at least about 0.25 gram per denier is sufficient for this purpose.

The processing of filamentary synthetic linear polyamide structures by heat under conditions of stretch is usually applied to such structures which have previously been at least partially cold-drawn, and in accordance with the instant invention it is preferred that the structure, preferably a cord, be cold-drawn so that the residual elongation of the yarn components is 18% or less. It is particularly desirable to utilize a structure which has been completely cold-drawn, that is, the yarn cold-drawn to a residual elongation or break elongation of 14% or less.

Determination of the force-to-draw transition temperature is accomplished conveniently upon filaments freshly produced at 275 yards per minute and forwarded at 2½ yards per minute to and about a hot steel snubbing pin 1 inch in diameter with chrome-plated matte finish and drawn thereby to 4½ times the original length (i. e., a 4.5 × draw).

The multiple stages of the stretching operation may be consecutive (e. g., by the use of multiple ovens or hot zones) so that the cord progresses continuously from one stage to the next, or the cord can be stored on packages and passed through the same oven in a second stage, when the oven has been adjusted to maintain the appropriate stretching conditions. It should be noted, however, that if the process is discontinuous, it is necessary that the cord be stored on solid packages so that it cannot retract appreciably during storage. It has been found desirable to wind such packages at a tension of at least about 0.25 gram per denier.

An oven suitable for stretching single cords in accord with the teachings of this invention is shown schematically in Figure 1. This arrangement is especially adapted to stretching at a constant stretch ratio and by proper control of the stretch ratio will stretch a cord at substantially constant tension. An alternate and preferred apparatus adapted to stretch cords at constant tension by direct control is shown in Figure 2, in which corresponding parts are correspondingly numbered.

Figure 1 shows an oven 10 containing a plurality of circumferentially grooved rolls 11, free to turn independently, about which cord 14 passes in its course through the oven. Hot air is introduced through inlets 12 and removed at exits 13, passing to a heater (not shown), whence it is recycled to the hot air inlets 12. The temperature within the oven is maintained constant by a conventional temperature sensing unit and control therefore, not shown. Cord 14 is wrapped a plurality of times about driven feed roll 15 and associated separator idler roll 16 from whence it passes through a dip tank 17 (which may contain an adhesive dip for application prior to the preferred stage), thence through window 19 into the hot stretching zone. The cord passes freely in multiple turns about rolls 11 and 11' and thence out through a window 20, over an idler roll 21 and about driven draw roll 22 and separator roll 23. The stretched cord goes to a conventional wind-up (not shown). The degree of stretch imposed upon the cord is determined by the peripheral speed of feed rolls 15 and draw rolls 22.

Figure 2:
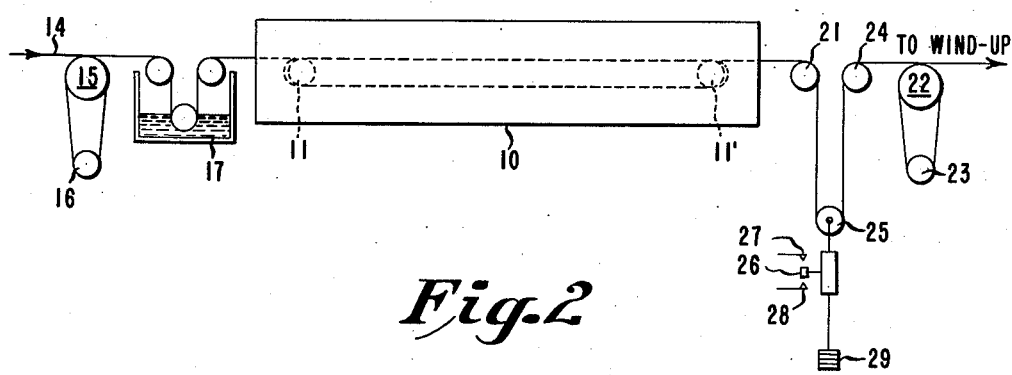

In Figure 2 is shown, schematically, a modification of the same oven adapted to stretching at constant tension. In Figure 2, like numbers indicate similar parts as in Figure 1. Cord 14 passes through the oven as before, and emerges to pass over idler roll 21, to dancer roll 25 and then over idler roll 24 to the draw roll combination 22, 23, and thence to the wind-up, maintained at constant tension. Dancer roll 25 has affixed thereto a contact 26 and a weight 29. The size of the weight controls the stretching tension in the oven. The contact 26 makes electrical connection with either contact arms 27 or 28 as the tension in the cord exceeds or is less than half of weight 29. Circuit completion between 26 and 27 or 26 and 28, as the case may be, is used to control, by conventional means (not shown), the variable speed feed roll 15, so that the stretching tension is maintained constant at the predetermined value.

The properties of tire cords are conventionally characterized by their breaking strength, tenacity in grams per denier (g. p. d.), break elongation, and elongation at various specified loads. Of particular importance in nylon tire cords is the quantity designated "cold growth." This quantity is the percent elongation of a known length of cord on which a load of 1.0 g. p. d. has been suspended for a period of 30 minutes. The cold growth thus includes not only the instantaneous elongation at the given load, but also the creep which has occurred over the 30-minute time interval. The cold growth is of importance in determining the increase in size of a tire when it is inflated. High values of cold growth are related to excessive increase in tire size, which increases the susceptibility of the tire to rapid wear, and increases the likelihood of tread cracking.

Two types of cold growth deserve consideration here.

"Conditioned cold growth" is cold growth of a cord which has been conditioned on a spool on which it was wound at a tension of .025 g. p. d., then stored for 48 hours at 65 relative humidity and 78° F. "Relaxed cold growth" is cold growth of a cord stored in skein form for 48 hours under similar conditions; since it is stored in skein form, it is therefore free to relax. The difference between these two values is illustrative of the stability of the cord, and is indicative of the degree to which the advantages of hot stretching are lost in storage under conditions such that the cord is free to relax. Cords showing excessive relaxation after hot stretching cause puckered and wavy fabric when the cords have been calendered (as a fabric) between opposing sheets of rubber.

Also of importance in determining the ease of tires manufacture are "free shrinkage" and "shrinkage tension" developed when a cord is heated. "Free shrinkage" is shrinkage of a known length of cord in an oven at a specified temperature under a negligible load (e. g., about 0.01 g. p. d.), measuring the (maximum) decrease in length. "Shrinkage tension" is the maximum tension developed (expressed in grams per denier) when a known length of cord, restrained from shrinking, is placed in an oven at a given temperature. Low values of both these properties are extremely important in a tire cord where ease of processing is desirable.

It is well known that hot stretching conditions which are excessively severe in any of the three variables of temperature, tension, and time, yield a cord which may have a reduced breaking strength or reduced resistance to cyclic fatigue. The fatigue of tire cords may be conveniently measured by the method of G. D. Mallory as described in U. S. Patent Number 2,412,524. In accord with this method the cords are embedded longitudinally and cured into a transversely reinforced section of rubber tubing. The section of tubing is bent at an angle of 90° and kept inflated while it is rotated about its own axis. The test cords are thus subjected alternately to extension and compression. "Fatigue life" is the number of revolutions (in kilocycles) required to cause the tube to fail. It is of paramount importance that all stretching conditions be limited so that the cords will have at least the minimum fatigue life which has been found to be acceptable for tire construction.

Although the process of this invention has been described in terms of treatment applied to a single end of cord, it is, of course, obvious that a plurality of ends of cord can be similarly processed in passing through an oven in parallel paths. Similarly multiple ends of cord can be woven into fabric and simultaneously processed in accordance with this invention to form a finished fabric to which sheet rubber can be calendered, as is well known in the art. A commercial unit for single stage treatment of such fabric is discussed by C. A. Litzler, Modern Textiles 35, p. 32 and following (February 1954). Such a unit can be readily adapted to the process of this invention by equipping it with three heating zones having intermediate tension control rolls as required.

It is also obvious that although the process of the invention has been described in terms of heating the cord during the stretching operation by means of hot air or other hot gas, the cord can alternatively be heated by passing over smooth or grooved heated plates, or by immersion in a bath of molten metal or heated oil or other liquid. In some cases it may be desirable to heat or blanket the cord during the stretching steps by means of an inert gas to minimize oxidation damage.

It is customary to treat nylon tire cord with an adhesive dip, whereby the cord adheres strongly to the rubber stock from which the tire is fabricated. The dip may be applied at any point in the process of the instant invention but preferably is applied after stage II and immediately prior to stage III, as shown in Examples A and B. This permits the dip to be cured during stage III processing step. If the dip is applied subsequent to stage III stretching, some of the desirable cord properties obtained by previous treatments is lost during the required subsequent dip curing process, whereas if the dip is applied before the stage I stretching operation, the dip will usually be damaged by undue exposure to the high temperatures unless a special heat resistant dip is employed.

Although it has been possible in some instances to obtain a fairly high cord tenacity by stretching in two stages, a cord thus treated does not have the desirable balance of properties obtained by the three-stage stretching process of this invention. For example, in a two-stage treatment in which the first-stage stretching is carried out at between about 180° C. and about 200° C. (30 seconds) at a tension of about 1.5 grams per denier, and the second-stage stretching is conducted at about the same temperature and the same length of time but at a high tension of the order of 3.9 grams per denier, the resulting stretched cord is characterized by a "free shrinkage" and "shrinkage tension" so high as to make tire building very difficult to the point of being nearly impossible unless special types of commercial tire building and working equipment are used. In contrast, nylon tire cord stretched in three stages in accord with the process of this invention can be readily used with any conventional tire building equipment to make tires of greater strength, stability, fatigue resistance and wear life than any hitherto known.

The process of this invention has been illustrated by its application to cords, yarns or filaments of polyhexamethylene adipamide, because of the great commercial interest in that polyamide. The process is also applicable to cords, yarns, or filaments of polycaproamide. In fact, the process has utility for linear fiber-forming polyamides generally, such as those polyamides disclosed by Carothers in U. S. Patents 2,071,250; 2,071,253; and 2,130,948.

The preferred cord stretching conditions disclosed herein may be excessively severe in temperature or exposure time for some polyamides. Such cords may be protected by blanketing with an inert gas during the stretching operation, or by the use of a heat-resistant, protective, adhesive dip. It is preferred, however, to add an antioxidant to the polyamide, such as those disclosed by Stamatoff in U. S. Patents 2,705,227; 2,640,044; and 2,630,421. Other useful additives are disclosed by Gray in U. S. Patent 2,510,777 and Dreyfus in U. S. Patent 2,345,700. It is also within the purview of this invention that the polyamide cord may contain conventional delusterants, pigments, and other additives as required.

EXAMPLES A, B, C, D, AND E

Table I following shows the conditions under which a linear polyamide cord is stretched in accordance with a one-stage (Examples D and E) and a three-stage (Examples A and B) process. Examples A and B illustrate specific embodiments of this invention, and Table II shows a comparison of the properties of cords produced by Examples A and B and cords treated in accordance with prior art single stage processes D and E. Example C in Table II shows the properties of a cord treated in accordance with the best single stage stretching process known. All of the cords exemplified are prepared from a standard commercial batch of high tenacity polyhexamethylene adipamide yarn which has been cold-drawn to a break elongation of 16.7%. The yarn is prepared from polymer to which has been added during the polymerization process 0.1% potassium iodide and 0.01% cupric acetate based on the weight of polymer. The yarn which was of 840 denier, 140 filaments has a tenacity of 10.0 grams per denier and an iniital modulus of 40.2 grams per denier. All cords are prepared in conventional manner by first twisting the single yarn 12.5 turns per inch Z twist, then the singles are combined in pairs at 12.5 turns per inch S twist to form a two-ply cord. This cord has a denier of about 1800 and is used in all of the hot stretching procedures referred to in Table I.

Examples A and B illustrating the instant invention were carried out in three stages, I, II, and III, respectively, the cord being subjected to treatment with a standard adhesive dip subsequent to stage II but prior to stage III. The stretching was performed in a hot stretching oven Model C–300, sold by W. M. Steele Company, Worcester, Mass., and the temperatures and conditions utilized which are particularly pertinent to this machine are believed to represent actual yarn temperatures. Using an oven of different size or dimensions, temperatures and other conditions may be varied in accordance with common practices well known to those skilled in the art. For example, in the hot stretching oven Model C, sold by Walter Kidde Company, Newark, New Jersey, the temperatures indicated in Examples A and B should be adjusted about 20 degrees higher in order to obtain comparable results. Similarly, in large commercial ovens, apparent temperature and other conditions may have to be varied somewhat over those shown in Examples A and B in order that the cord will be subjected to substantially the same effective conditions shown in these examples. All parts and percentages are by weight unless otherwise indicated.

Table I
STRETCHING CONDITIONS

| Example | A | | | B | | | C | D | E |
|---|---|---|---|---|---|---|---|---|---|
| Stage | I | II | III | I | II | III | I | I | I |
| Temperature, °C | 230 | 160 | 230 | 190 | 160 | 210 | 230 | 210 | 225 |
| Tension, G. P. D.[1] | 2.1 | 0.2 | 1.0 | 2.5 | 1.5 | 1.0 | 2.1 | | |
| Stretch ratio, percent [2] | +19 | −3 | +6 | | −3 | | | 14.7 | 13.4 |
| Time, sec | 30 | 30 | 60 | 30 | 30 | 60 | 30 | 14 | 18 |

[1] Based on denier of the original (unstretched) cord.
[2] Percent stretch ratio = $\frac{\text{output roll speed} - \text{input roll speed} \times 100}{\text{input roll speed}}$

Table II
CORD PROPERTIES

| Example | A | B | C | D | E |
|---|---|---|---|---|---|
| Tenacity, G. P. D.[1] | 9.0 | 8.9 | 8.7 | 8.4 | 8.5 |
| Conditioned CG | 4.8 | 5.0 | 4.9 | 3.9 | 4.6 |
| Relaxed CG | 4.9 | 5.3 | | 6.2 | 5.5 |
| Shrinkage tension, G. P. D. (at 160° C.) | 0.28 | 0.27 | 0.37 | 0.50 | 0.37 |
| Free shrinkage, percent (at 160° C.) | 5.6 | 8.1 | 8.0 | 11.0 | 9.1 |
| Fatigue (kilocycles) | 680 | 752 | 650 | | |

[1] Based on the final denier of the stretched cord (free from dip).

The claimed invention:

1. A process comprising subjecting a synthetic linear polyamide strand to dry heat treatment in three consecutive stages: stage I treatment being at a temperature of at least about 190° C. but not more than about 15° C. below the melting point of the polymer, and for between about 10 and about 120 seconds at substantially constant strand tension between about 1.5 and about 3.0 grams per denier; stage II treatment being at a temperature less than the temperature of stage I treatment but greater than the force-to-draw transition temperature of the polymer and for between about 10 and about 120 seconds at a substantially constant tension sufficient to allow the strand to shrink from about 1% to about 10% of its length upon leaving stage I; stage III treatment being at a temperature at least as high as that of stage I treatment but not higher than about 15° below the melting point of the polymer, and for between about 10 and about 120 seconds at a substantially constant strand tension at least as high as the shrinkage tension of the cord product of stage I measured at the temperature of stage III treatment; followed by cooling the cord to a temperature at least 10% lower than the treatment temperature in stage III while maintaining the strand under sufficient tension to prevent substantial shrinkage.

2. The process of claim 1 in which the strand is treated with a dip subsequent to stage II treatment but prior to stage III treatment.

3. The process of claim 1 in which the filaments of the polyamide strand, prior to treatment, have a break elongation of less than about 18% and the strand is treated with an antioxidant prior to stage I.

4. The process of claim 3 in which the polyamide is polyhexamethylene adipamide.

5. The process of claim 4 in which stage I treatment is carried out at a temperature between about 220° C. and about 240° C. for between about 15 and about 45 seconds at a substantially constant strand tension between about 2.0 and about 2.3 grams per denier; stage II treatment is carried out at a temperature between about 155° C. and about 165° C. for between about 15 and about 45 seconds at a substantially constant strand tension sufficient to allow the strand to shrink between about 1% and about 10% of its length upon leaving stage I; stage III treatment is carried out at a temperature between about 220° C. and about 240° C. for between about 30 and about 90 seconds at a substantially constant strand tension of between about 0.75 and about 1.25 grams per denier.

6. The process of claim 5 in which the strand is treated with a dip subsequent to stage II treatment but prior to stage III treatment.

7. The process of claim 6 in which the polyamide contains an antioxidant comprising potassium iodide and cupric acetate.

References Cited in the file of this patent

UNITED STATES PATENTS 2,509,741    Miles _____ May 30, 1950